A. H. GILMAN.

SPINDLE FOR SPINNING.

No. 4,094. Reissued Aug. 9, 1870.

Witness

Henry C. Houston

Buckley Seavey

Inventor

A. H. Gilman

Per Wm. H. Clifford Atty.

United States Patent Office.

ALBERT H. GILMAN, OF BOSTON, MASSACHUSETTS.

*Letters Patent No.* 66,017, *dated June* 25, 1867; *reissue No.* 4,094, *dated August* 9, 1870.

IMPROVEMENT IN SPINDLES FOR SPINNING.

The Schedule referred to in these Letters Patent and making part of the same

*To all whom it may concern:*

Be it known that I, ALBERT H. GILMAN, of Boston, in the county of Suffolk and State of Massachusetts, have invented a new and useful Spinning-Spindle; and I do hereby declare that the following is a full, clear, and exact description thereof, which will enable others to make and use my invention, reference being had to the accompanying drawing forming part of this specification, in which—

Figure 1:
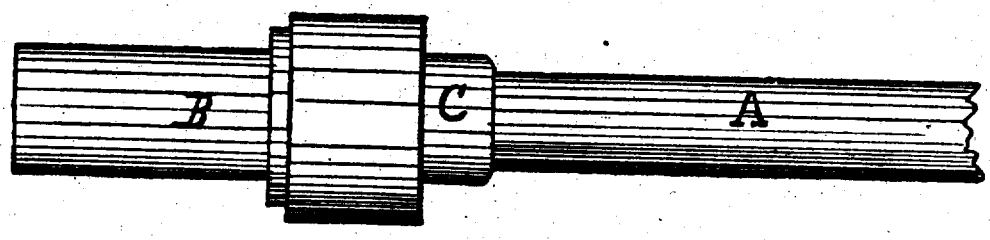
Figure 1 is an elevation.
Figure 2:
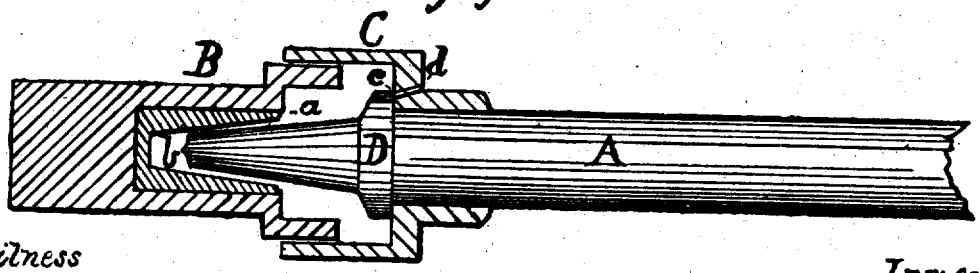
Figure 2 is a longitudinal section of the spindle with the collar, cap, and step.

The nature of my invention consists in the application of a step, cap, or cover to a spindle, in such manner that the cap will be revolved with the spindle when the said spindle is in motion, or the said cap may be freely raised off from the step in order to allow the same to be oiled.

It further consists of the combination of a collar or enlargement with the spindle and the step, as hereinafter explained.

In the drawing—

A denotes the spindle;

B, the step;

*a*, the bushing of the step;

*b*, the point of the spindle; and

C, the cap of the step.

The cap encompasses the spindle at near the lower part thereof, and also embraces or surrounds the step, being enlarged for such purpose.

The cap rests on an annulus or enlargement of the spindle, and so revolves with the spindle and annulus.

A hole, *c*, is bored vertically in the cap to receive a pin, *d*, extending upward from the collar, to secure the cap, or other methods may be employed for this purpose, as a leather washer placed on the collar and around the spindle, but this would not be so advantageous as other well-known methods, not claimed in and by themselves.

The collar subserves several purposes:

First, it supports the cap.

Second, it serves as a protector of the step against dust, waste, or extraneous matter that may work down into the step, and prevents the oil from working up and being wasted by the revolution of the spindle, filling or closing up, as it may do, the enlarged part of the opening of the step or its cap, and even if the device were so constructed that the cap did not revolve with the spindle, the collar D will serve as a protection to the step, and for the purposes described.

The cap may be so applied, as indicated, as to be capable of slipping up and down on the spindle, in order to supply the step with oil, different from the common application, where the cap is fastened by a screw or otherwise, and cannot be slipped up on the spindle.

What I claim as my invention, and desire to secure by Letters Patent, is—

1. The combination of the steel cap and the spindle, in such a way that the same will revolve with the spindle, or allow it to be freely raised off the step, to enable the step to be supplied with oil, as described.

2. The combination of the spindle, having the enlargement D arranged with a step, as described, the collar being for the purposes set forth.

3. The arrangement of the spindle A, having the enlargement D and the cap C, provided with the means of securing said cap to the spindle, and all with the step B, as herein described.

A. H. GILMAN.

Witnesses:

JAMES T. BUSWELL,

EDW. E. WOODMAN.